(12) United States Patent
Britz

(10) Patent No.: US 7,011,130 B2
(45) Date of Patent: Mar. 14, 2006

(54) LAMINATOR FOR APPLYING A PROTECTIVE LAYER TO A DISC

(75) Inventor: Todd A. Britz, Maple Grove, MN (US)

(73) Assignee: Primera Technology, Inc., Plymouth, MN (US)

( * ) Notice: Subject to any disclaimer, the term of this patent is extended or adjusted under 35 U.S.C. 154(b) by 0 days.

(21) Appl. No.: 10/688,862

(22) Filed: Oct. 17, 2003

(65) Prior Publication Data

US 2005/0081978 A1  Apr. 21, 2005

(51) Int. Cl.
 *B30B 15/00* (2006.01)
(52) U.S. Cl. .................................. 156/582; 156/583.1
(58) Field of Classification Search ................ 156/555, 156/580, 582, 583.1; 100/327, 328, 334; 492/15, 46, 60
See application file for complete search history.

(56) References Cited

U.S. PATENT DOCUMENTS

| | | | |
|---|---|---|---|
| 1,472,802 A | 11/1923 | McDonald | |
| 4,060,441 A * | 11/1977 | Ohta et al. .................. | 156/234 |
| 5,518,325 A | 5/1996 | Kahle ......................... | 400/70 |
| 5,542,768 A | 8/1996 | Rother et al. .......... | 400/120.16 |
| 5,549,444 A | 8/1996 | Dubuit ..................... | 414/796.7 |
| 5,734,629 A | 3/1998 | Lee et al. ..................... | 369/34 |
| 5,873,692 A | 2/1999 | Costas ..................... | 414/796.9 |
| 5,927,208 A | 7/1999 | Hagstrom et al. .......... | 101/486 |
| 5,934,865 A | 8/1999 | Meadows ................ | 414/796.9 |
| 5,946,216 A | 8/1999 | Hollerich .............. | 364/478.11 |
| 6,021,029 A | 2/2000 | Mamiya et al. ............. | 360/133 |
| 6,111,847 A | 8/2000 | Assadian .................... | 369/178 |
| 6,141,298 A | 10/2000 | Miller ......................... | 369/30 |
| 6,148,722 A | 11/2000 | Hagstrom ................... | 101/35 |
| 6,222,800 B1 | 4/2001 | Miller et al. ................. | 369/36 |
| 6,270,176 B1 | 8/2001 | Kahle ............................ | 347/2 |
| 6,302,601 B1 | 10/2001 | Hagstrom et al. .......... | 400/283 |
| 6,321,649 B1 | 11/2001 | Vangen et al. ................ | 101/35 |
| 6,327,230 B1 | 12/2001 | Miller et al. ................. | 369/34 |
| 6,332,680 B1 | 12/2001 | Ozawa ...................... | 347/104 |

(Continued)

FOREIGN PATENT DOCUMENTS

EP  0 799 710 A1  10/1997

(Continued)

OTHER PUBLICATIONS

Copy of partial international search report (Europe).

(Continued)

*Primary Examiner*—James Sells
(74) *Attorney, Agent, or Firm*—Westman, Champlin & Kelly, P.A.

(57) ABSTRACT

The laminator for laminating protective, appearance changing film layer onto surfaces of CD's, DVD's, and other discs has a heated laminating roller that will press a web carrying the film onto the disc in regions on which pressure can be applied. In order to maintain the roller at a uniform surface temperature, the roller is continuously rotated whenever the roll heater is energized and the roll temperature is above a selected level so that the roller will maintain uniform temperature between laminating operations. The laminator has a supply roll for the web carrying the film, and a circuit board carrying a memory device is mounted on the interior of a hollow core of the supply roll in a manner that permits making contact with stationary members on the laminator to read information for enabling operating. A hub ring on the laminator is movable to a position to be spaced from a disc so no lamination takes place above the hub ring.

17 Claims, 12 Drawing Sheets

U.S. PATENT DOCUMENTS

| | | |
|---|---|---|
| 6,364,552 B1 | 4/2002 | Nehowig et al. ............ 400/613 |
| 6,400,659 B1 | 6/2002 | Kitaoka ........................ 369/34 |
| 6,447,181 B1 | 9/2002 | Hagstrom et al. ...... 400/120.01 |
| 6,580,444 B1 | 6/2003 | Drynkin et al. .............. 347/171 |

FOREIGN PATENT DOCUMENTS

| | | |
|---|---|---|
| EP | WO 99/62721 A1 | 12/1999 |
| EP | 1 120 785 A1 | 8/2001 |
| GB | 1 472 802 | 5/1977 |
| JP | 2002056584 | 2/2002 |

OTHER PUBLICATIONS

Sketch of admitted prior art.
Copy of International Search Report (Europe).
Copy of Written Opinion.

* cited by examiner

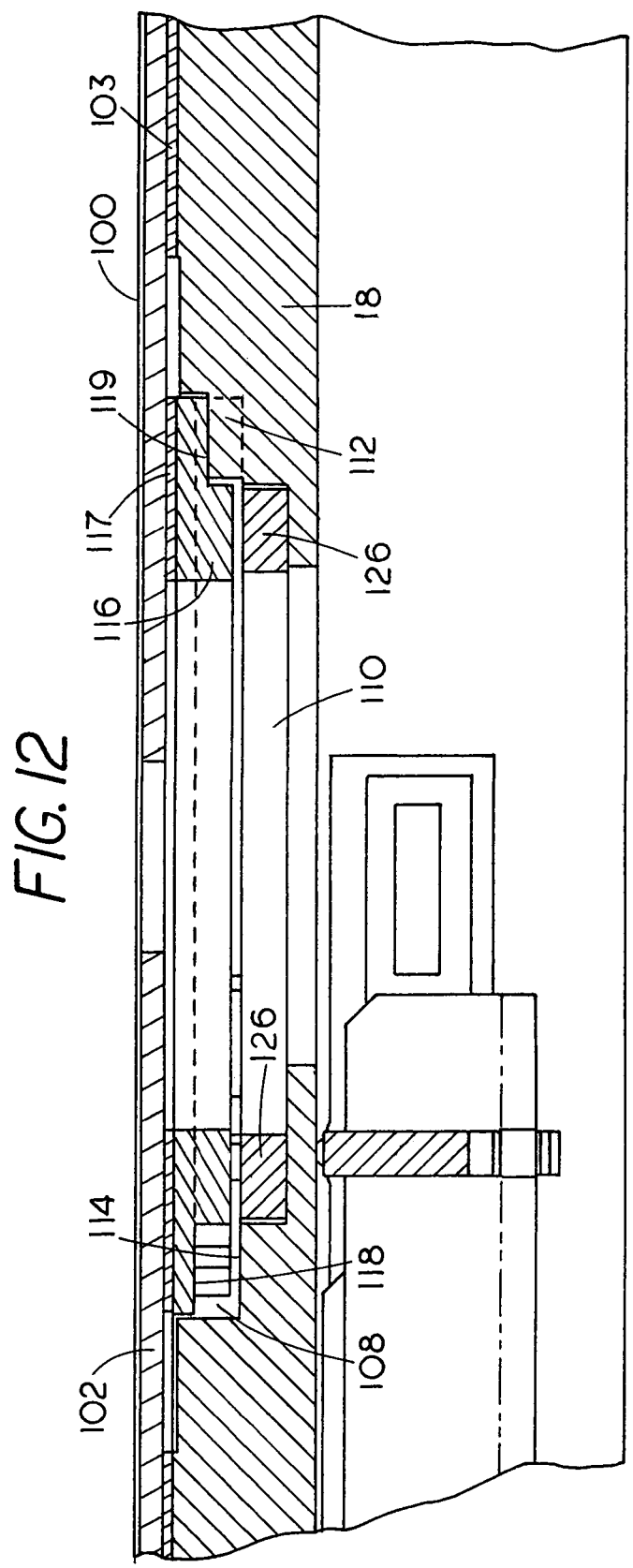

LAMINATOR FOR APPLYING A PROTECTIVE LAYER TO A DISC

BACKGROUND OF THE INVENTION

The present invention relates to a laminator which is used for applying a layer of protective material onto a disc, such as a CD, DVD, or the like, wherein the layer that is laminated onto the disc protects, preserves and enhances the appearance of printing and any decorative or identifying logos, and the like on the disc, as well as carrying holograms for security, if desired.

Various laminators have been advanced, and it has been discovered that in order to satisfactorily laminate a layer to a disc, the heated roller that is used for laminating the film layer has to be maintained at a sufficiently high and uniform temperature to provide for reliable lamination. Problems have arisen in existing laminators since the roll is intermittently stopped, and cool regions are caused on the roll because of exposure of the roll to atmosphere through a slot provided for the roll to protrude through to engage the lamination mterial.

Additionally, it has been important to provide precise information relating to the laminating material on that supply roller. The supply roller is keyed to controls on the laminator and there is a need for communicating the type of laminating film, as well as providing enabling information to insure the laminator and roll to be used are compatible, and containing information as to the quantity of film left on the roll. It is important that the information needed be stored and remain with that supply roll, because the rolls can be removed and used at a later time.

SUMMARY OF THE INVENTION

The present invention relates to a laminator for laminating a layer of film material onto a disc, such as a CD, DVD, or similar disc. The laminate film material is carried on a web and under heat and pressure is laminated as a thin layer on the disc. The layer is generally clear so that the printed information on the disc can be read. Also the layer applied can contain information, such as holograms, or other information detectable from the layer after lamination.

The laminating apparatus includes a heated roll for pressing the web that carries the layer of laminate film on it against the disc, and to cause the film laminate material from the web to adhere to the surface of the disc when heated and under pressure from the laminating roll. In order to insure that the roll temperature is adequately high, and that sections of the roll are not cooled by standing still, the roll is rotated constantly in response to sensed temperature on the roll. No section of the roll is excessively cooled by radiation and convection in the needed open slot area that exposes the roll for lamination.

Additionally, the present invention provides a unique support for a memory carrying circuit board that has the identification information about the roll, and the information about the type, length and other information about the lamination film on the roll, and mounts right inside the roll.

Connections from the circuit board components, in the form shown a read/write memory device (R/W), to the controller on the laminator are also provided in a reliable manner.

The disc support tray that supports the disc for processing has a center hub that can be adjusted in position, so the upper surface is co-planar with outer portions of the support tray and the lamination layer will then be applied to the center portion of the disc. The hub can be positioned to recess the hub upper surface and in such position the laminate would not be applied to the disc because the disc would not be supported by the hub and there would not be sufficient pressure from the lamination roll in the recessed hub region.

BRIEF DESCRIPTION OF THE DRAWINGS

FIG. 12 is a sectional view with the hub in place taken along line 11—11 in FIG. 9 with the hub rotated 60°.

DETAILED DESCRIPTION OF THE PREFERRED EMBODIMENTS

Figure 1:
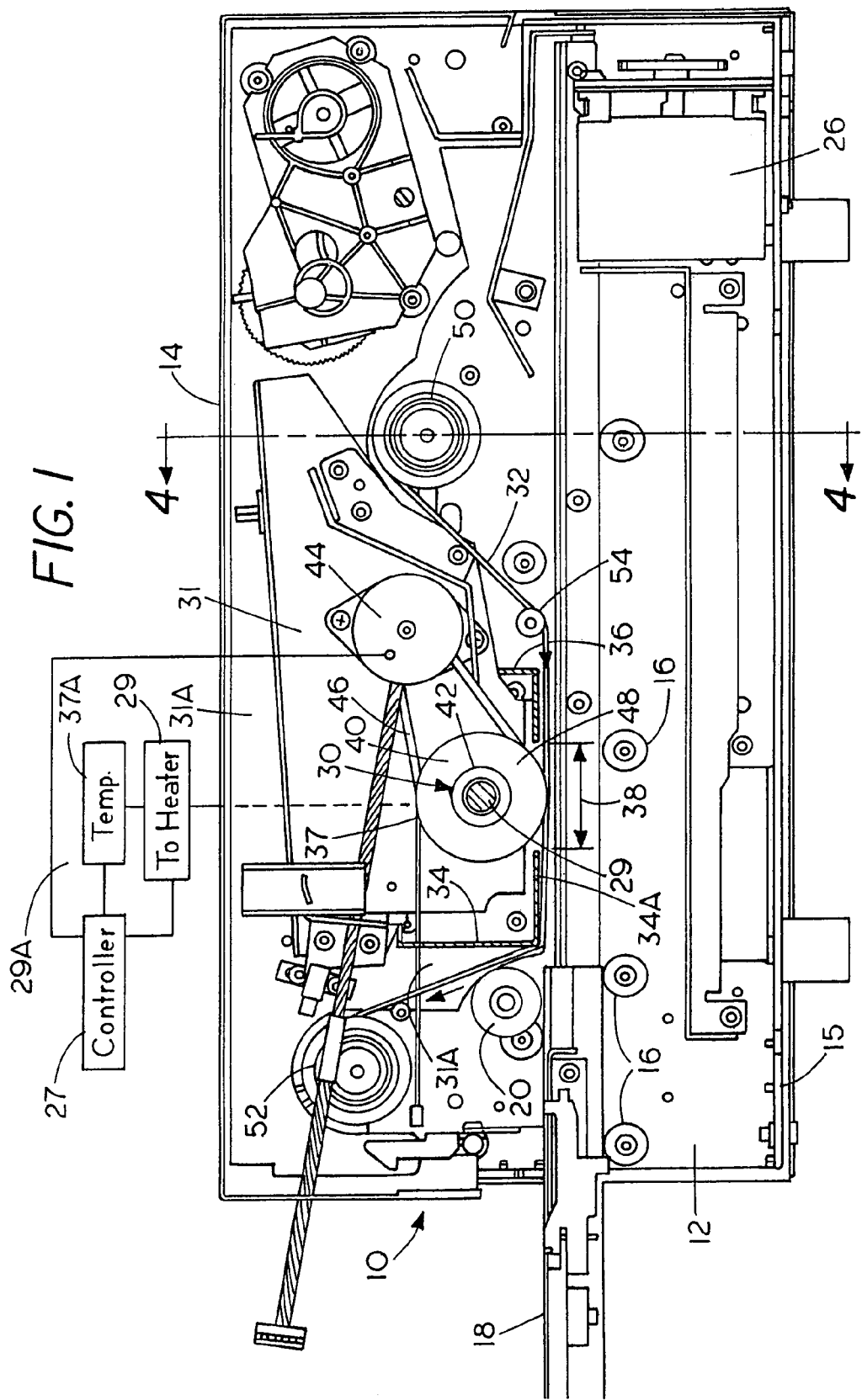
FIG. 1 is a side sectional view of a typical laminating machine assembly showing a heated laminating roller and a lamination web.

As shown in FIG. 1, a laminating apparatus or laminator indicated generally at 10 is used for laminating a layer of film material from a web onto a disc, such as a CD, DVD, or the like. The general layout of the laminating apparatus is known, and includes an outer frame 12 that has spaced apart side plates 14, 14 that are joined with a bottom plate 15 to form the main frame.

Bottom plate 15 and side plates 14 are used for mounting various motors and other drives.

Figure 2:
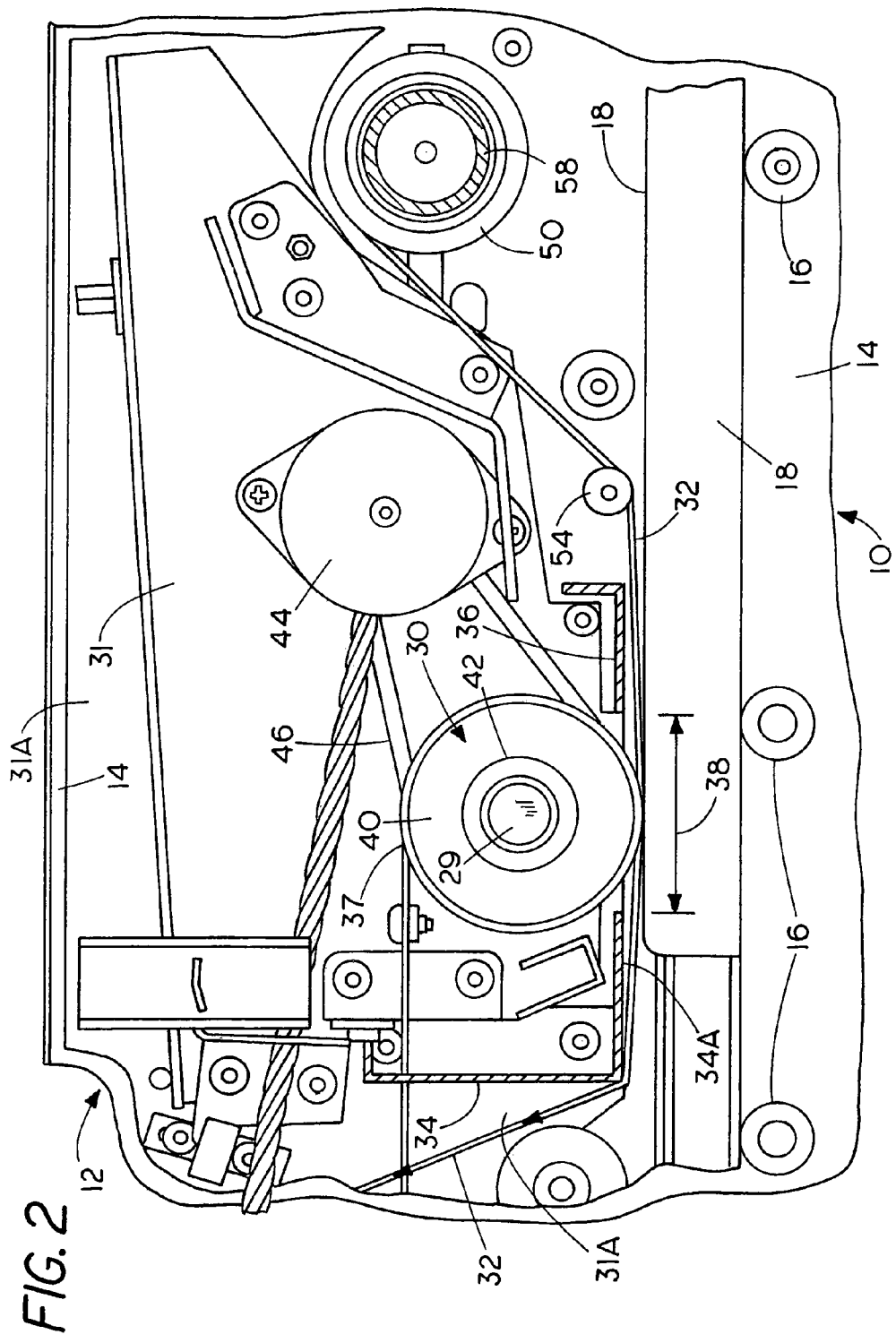
FIG. 2 is an enlarged side sectional view of a laminating roller section shown in FIG. 1.

The laminator 10 includes a series of spaced apart sets of rollers 16 and 16A that are used for supporting a tray 18 that in turn supports a CD, DVD, or other disc on which the protective film layer is to be laminated. The rollers 16A, as shown in FIG. 2, are grooved to receive an edge portion 19 of the tray 18. The rollers 16 support the other edge of the tray, but the grooved rollers 16A guide the tray as it is moved.

A hold down roller 20 is provided above the tray 18 and is used for retaining a CD to be laminated in a recessed receptacle on the tray 18 as it proceeds through the lamination station (see FIGS. 9–12). The tray 18 is driven from an extended or loading position to move a disc inwardly past the laminating roller and then reversed for laminating the web on the disc as the tray moves outwardly by a suitable, longitudinal screw shown in FIG. 4 at 22, driving a bracket 24 that is fixed to the tray 18. The screw 22 is driven from a suitable controllable and reversible motor such as that shown at 26 in FIG. 1.

A heated laminating roller indicated at 30 is mounted onto a pair of pivoting side plates 31 (only one of which is shown in FIG. 1), that will permit raising the heated roller 30 upwardly during a laminating cycle until the tray 18 is positioned for lamination of a disc carried on the tray. The side plates 31 and roller 30 are moved downwardly to its home or laminating position shown in FIG. 1, wherein it is in a position to provide pressure against a laminating web 32 and press it onto a disc that is carried in the tray 18. The tray 18 is first moved into the housing and then moved outwardly while the laminating roller rotates and the laminating film is advanced so the film is applied to the disc. The tray 18 is shown only in its extended position in FIG. 1, and a retracted position immediately before starting outward laminating movement in FIG. 2.

The laminating roller 30 is a heated roller provided with power in a suitable manner, as is well known. A stationary cartridge heater 29 is installed in the center of a hollow core of roller 30, so that the roller surface can be maintained at a temperature high enough to permit the laminating film on the web 32 to be laminated onto a surface on which the heated roller 30 presses the film.

A pair of pivoting lid side frames 31A that are used for mounting the pivoting side plates 31 have cross shield panels 34 and 36 that extend laterally between the two lid side frames 31A, and thus the cross shield panels, extend along the longitudinal length of the roller 30. The panels 34 and 36 are shown in cross section in FIGS. 1 and 2 and in plan view in FIG. 3. The panel 34 has a section or flange 34A that extends from the main panel toward the roller 30 so an edge of the section 34A is close to the roller. The second shield panel 36 is provided on the opposite side of the roller 30 from flange 34A.

Figure 3:
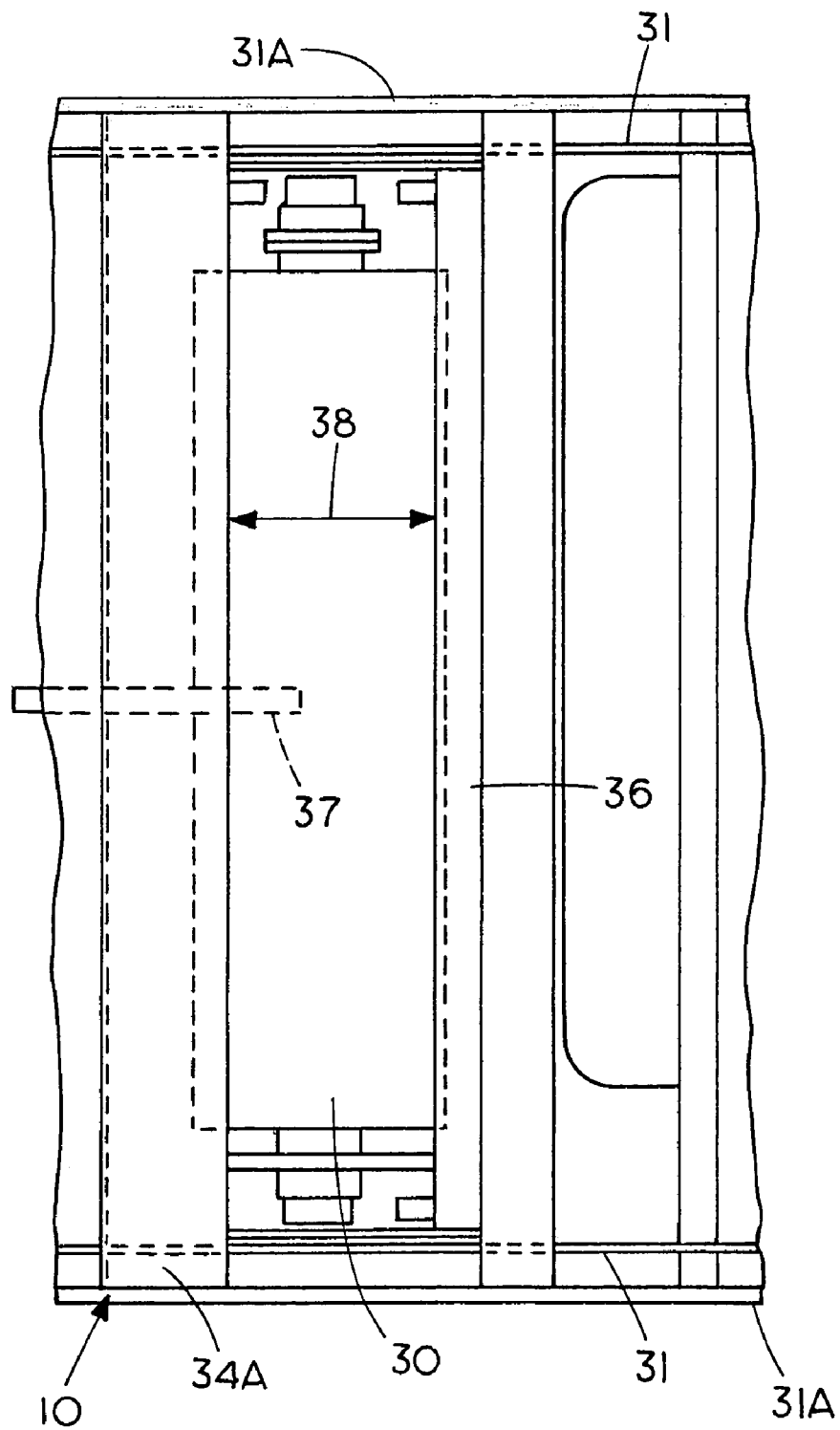
FIG. 3 is a bottom plan view of a laminating roller and shield arrangement.

An opening indicated by the double arrow 38 is left between the shield panels through which a lower portion 48 of the roller 30 is exposed below a plane defined by the edge of shields 34A and 36 and through which opening a portion of the roll protrudes. The lower portion of the roller 30 provides pressure onto a disc supported in a tray 18, when the tray 18 is moved underneath the roller 30. Also, this opening is shown in FIG. 3.

The roller 30 itself is a soft roller, having a soft elastomeric outer layer 40 that is supported on a center tubular core 42. The stationary cartridge heater 29 is supported on the frame 12 and the tubular core 42 is rotatably mounted on supports on the cartridge heater 29 50 it rotates about the axis of the heater 29. The core 42 is rotationally driven from a stepper motor 44 through the use of a drive belt 46. The stepper motor 44 is mounted onto one of the pivoting side plates 31, and moves with the roller and cartridge heater. The stepper motor 44 is connected to power through the controller including using a temperature sensor signal so the stepper motor is stepped constantly at a selected rotational rate when the roll temperature is greater than a selected amount indicating that the roll is ready, or almost ready, for laminating.

Suitable electrical connections are made to the heater 29. The roll temperature is monitored and controlled using an internal thermocouple in the cartridge heater and a sliding temperature sensor 37 on the surface of the roller 30 so the temperature will be the proper temperature to laminate the film from the web 32 onto a disc on tray 18. A sliding temperature sensor 37 (FIGS. 1 and 2) rides on the surface of roller 30 under a low spring pressure and senses the surface temperature of the roller. The sensor 37 is above the shields 34A and 36. The signal from temperature sensor 37 is used for initiating the stepper motor 44 and keeping it constantly running or stepped at a rate to keep the surface temperature even across the entire roller periphery.

In order to minimize temperature differentials around the periphery of the roller 30, and particularly to avoid the exposed portion shown at 48 that extends through from cooling excessively at the opening 38, once the roller is heated, the stepper motor 44 is driven to continuously step and rotate the roller 30. This will result in an even temperature on the roll periphery because no segment of the surface, such as at 48, will remain stationary in the opening 38 so that that portion cools.

The stepper motor 44 will step or rotate the roller 30 at a rate that is selected, for example, in the range of 20 revolutions per minute. When the tray 18 is being moved underneath the roller 30, the motor 44 can be turned off (not stepped) and permitted to coast, so that the roller 30 will press on the laminate, and will not slip relative to the web 32.

The web 32 is provided with a supply roll or roller 50, and a take up roll or roller 52. Take up roll 52 is driven by a motor controlled by the controller 27. The take up roll 52 is driven to insure removal of the used web from the lamination region. The take up roll 52 will be driven when a disc is being moved on the tray 18 underneath the heated laminating roller 30. The web 32 is moving from supply 50 to take-up roll 52, and the laminating is done while the tray 18 moves in the same direction. The web 32 is supported on suitable guide rollers such as that shown at 54, and can be guided around a corner of the bracket 34, as shown, from the supply roll 50 to the take up roll 52.

The supply roll 50 is the source of the source web and the laminate film, and it is important to know that the web and supply roll are compatible and proper for use with the laminator.

Figure 4:
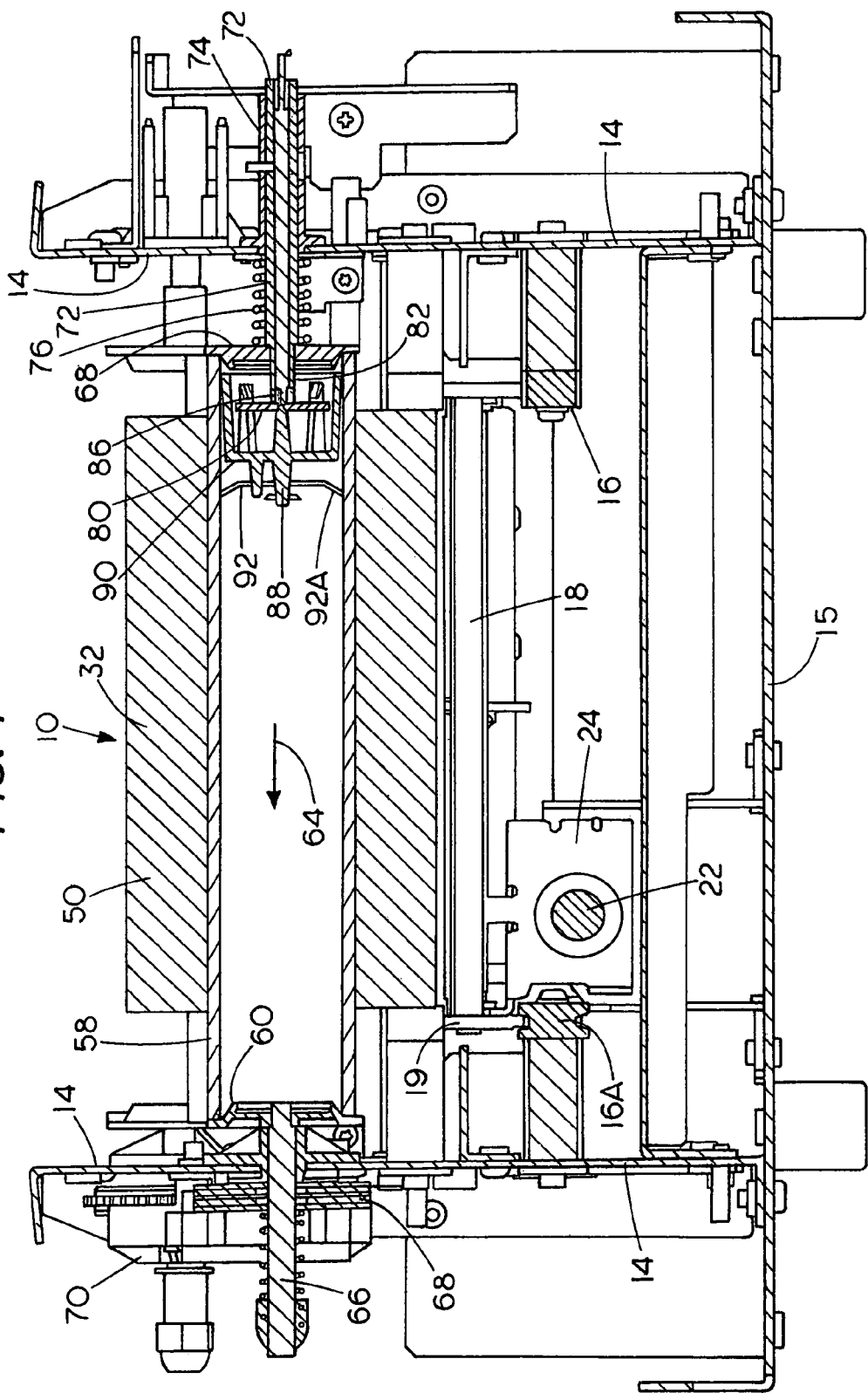
FIG. 4 is an enlarged sectional view taken on line 4—4 in FIG. 1, taken through a laminating web supply roll.

As shown in FIG. 4, the supply roll 50 has a supply of the web 32 stored thereon. The supply roll 50 has a hollow core 58 with the web wrapped around the core. The hollow core 58 is supported on first and second tapered hubs 60 and 62. The hub 60 is mounted on a shaft 66. A spring loaded slip clutch and gear train 68 are used to apply a resistant torque on the hub 60 and therefore tension in the web 32. The hub 60 is retained from axial movement in direction away from the roll 50. The hub 62 is spring loaded with a spring 79 in direction indicated by arrow 64 so that the core is held between and on the hubs 60 and 62.

Figure 5:
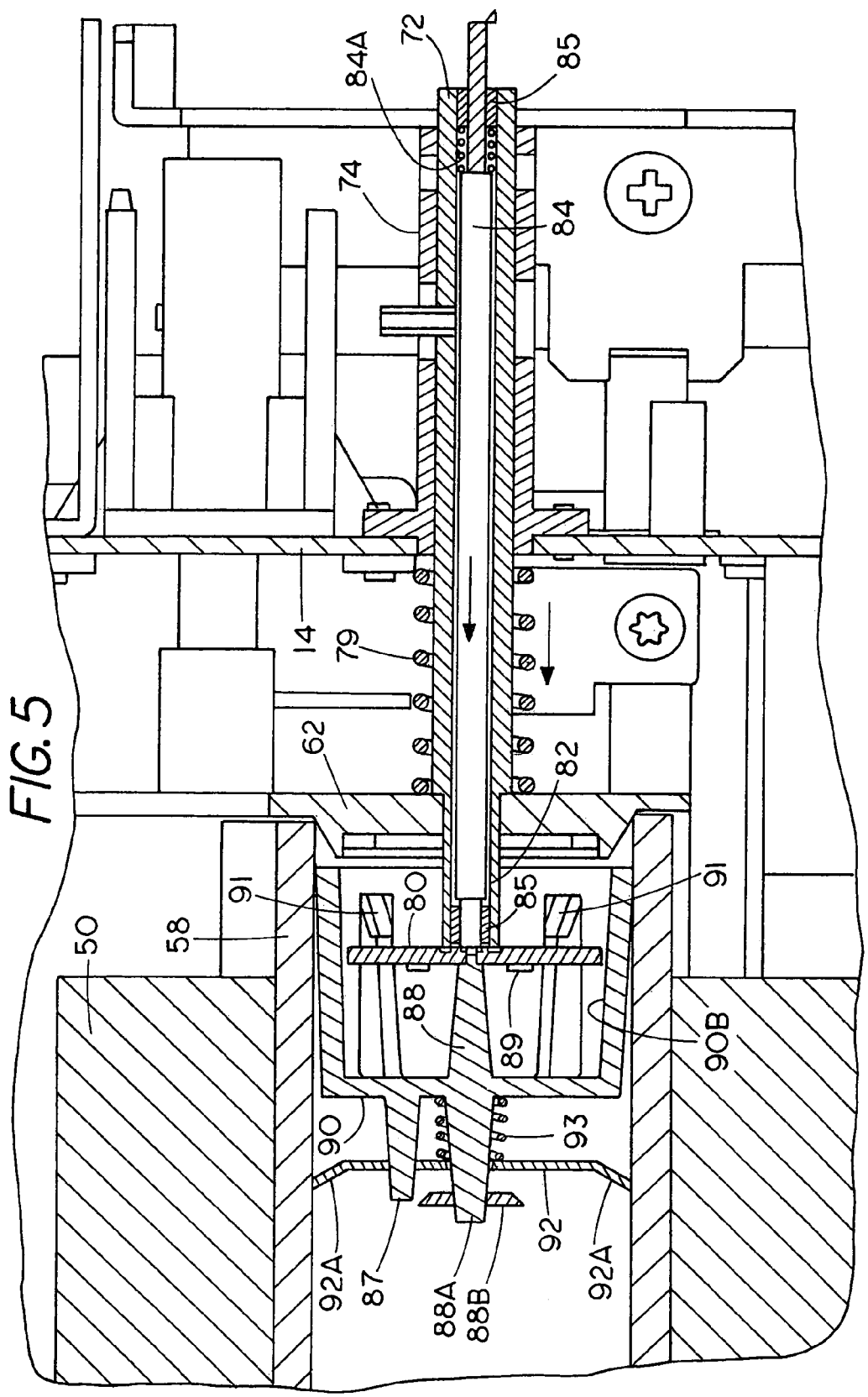
FIG. 5 is an enlarged fragmentary sectional view of the shaft and circuit board mounted on FIG. 4.
Figure 6:
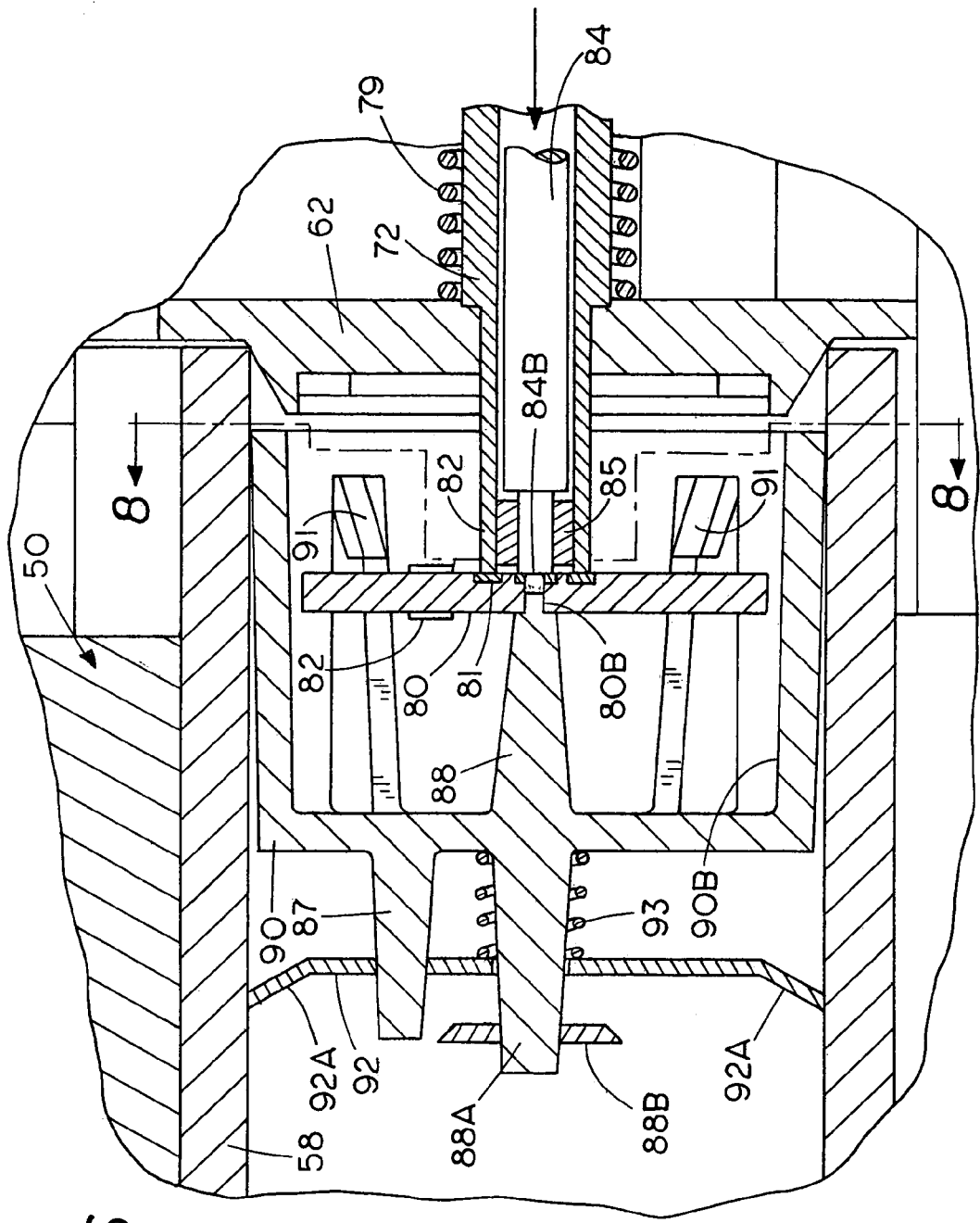
FIG. 6 is a further enlarged sectional view of one end of a web supply roll shown in FIGS. 4 and 5 illustrating details of a circuit board.
Figure 7:
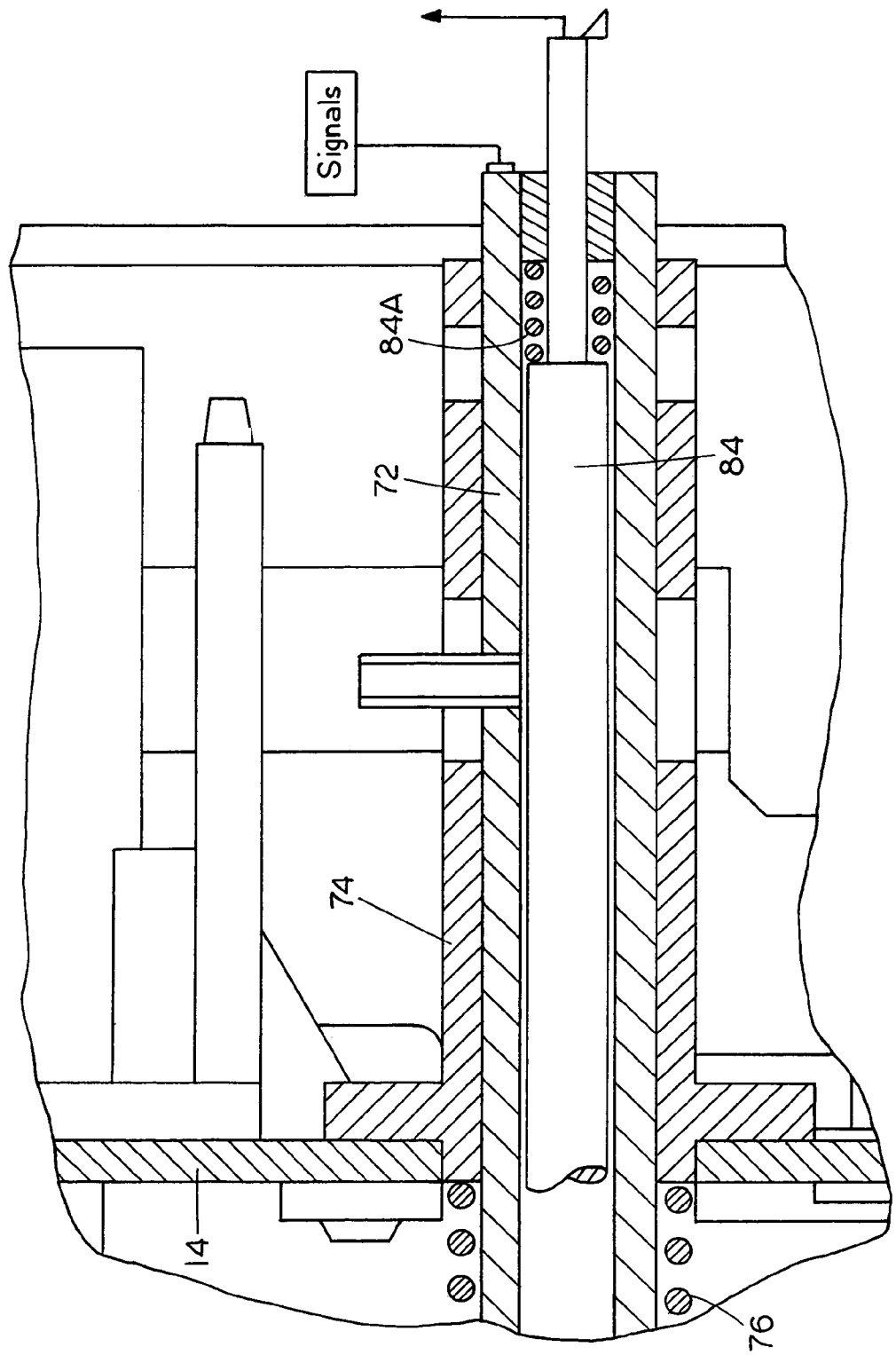
FIG. 7 is a further enlarged sectional view of an outer end of the shaft shown in FIG. 5.
Figure 8:
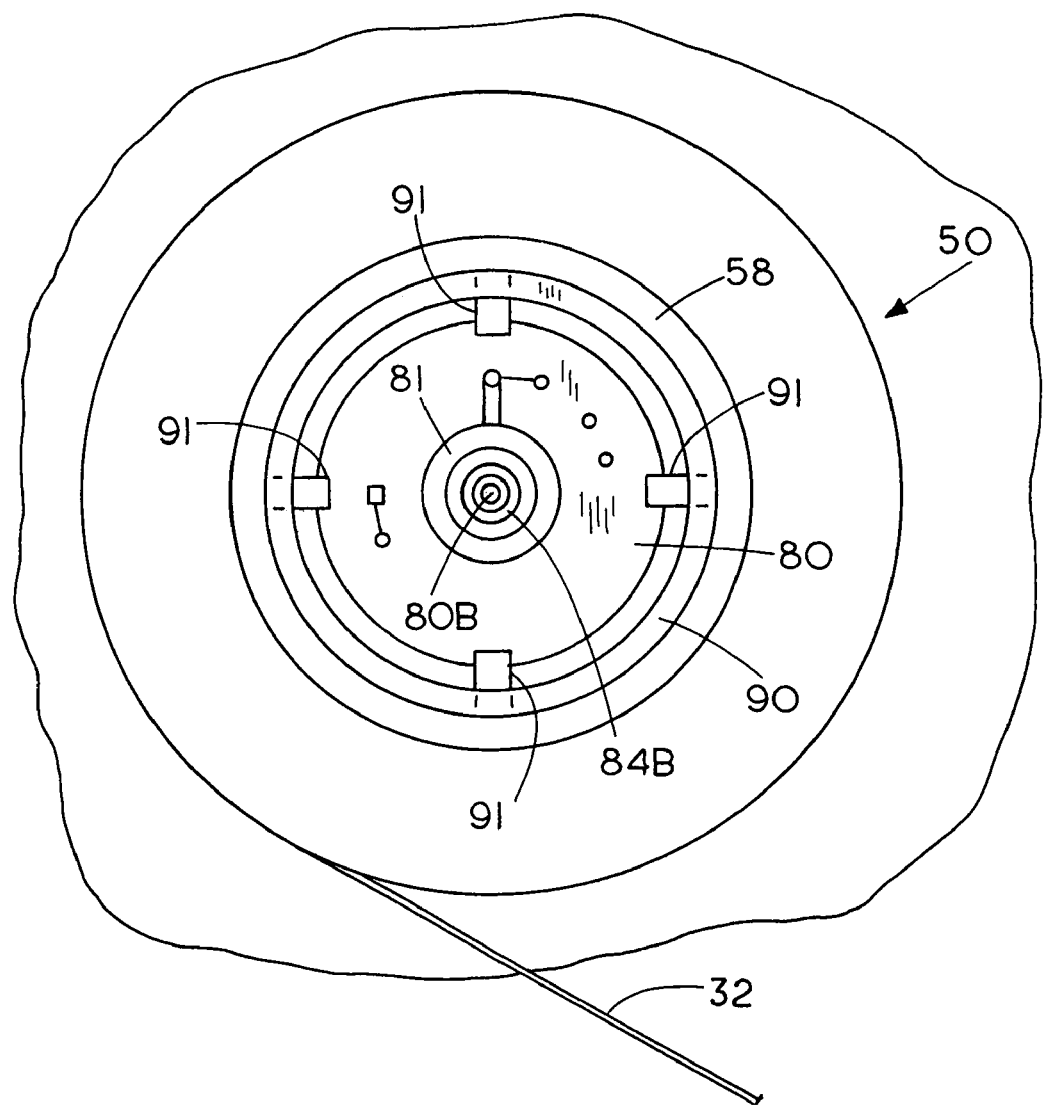
FIG. 8 is a schematic end view of the roller showing a circuit board and mounting taken on line 8—8 in FIG. 5.

As shown in greater detail in FIGS. 4, 5 and 6, the hub 62 on the opposite end of the core 58 from hub 60 is rotatably mounted on a stationary (non-rotating) tubular shaft 72. The tubular shaft 72 is supported on a suitable hub 74 that is fixed on the side panel 14 of the frame. The hub 74 is stationary, and it supports an outer end portion of tubular shaft 72. The tubular shaft 72 also is held from rotation with a suitable pin extending through a slot in the hub 74 as shown. Spring 79 surrounds shaft 72 and urges the hub 62 into position in the core 58, and then also urges the core over against the hub 60. The spring 79 has one end acting against the hub 74 that is fixed to side wall 14.

In order to provide information that is needed for operation of the laminator, in other words to enable the laminator, and to identify the web type and length of web remaining and other information about the web material, a circuit board 80 is supported on the interior of the hollow core 58 of roll 50. The circuit board 80 contains a programmable read/write memory device that contains the necessary or desired information for operation of the laminator. The circuit board 80 is contained inside a plastic, non-conductive cup like cage 90 that slips into and slides relative to the core 58. A spider 92 is a spring spider used commonly in roll cores to form a fixed retainer. It has prongs 92A that dig into the interior surface of core 58. The spider 92 is placed in the core inwardly of the cage 90. The spider 92 is fixed axially in the core. A rear or inner wall of the cage 90 has a rearwardly directed pin 87, that slides in an opening of the spider to keep the cage oriented annularly.

The center portions of the spider or retainer 92 backs a spring 93 that acts between the spider 92 and the cage 90 to urge the cage and the circuit board toward an end surface of a portion 82 of the tubular stationary shaft 72 that is inside the core. The cage 90 includes an integrally molded center pin or pilot shaft 88. The center pin 88 has a centering end pilot boss that fits into an opening BOB in the center of the circuit board 80. The end surface of shaft 72 is engaged by an annular contact 81 that surrounds and is spaced from the center opening 80B in the circuit board.

The tubular shaft 72 slidably supports a center shaft 84. The shaft 84 is supported on pressed-in, non-conductive bushings 85 on ends of the interior of the tubular shaft 72. The bushings 85 permit the shaft 84 to move axially a limited amount. The shaft 84 is spring loaded with a spring 84A that acts between an outer end bushing 85 and a shoulder on the shaft 84 at the outer end thereof. The shaft 84 is therefore spring loaded toward the circuit board 80, and the end of the slidable shaft 84 bears against and centers on a center feed through contact 84B at the opening 80B on the circuit board 80. The shaft 84 is electronically insulated from tubular shaft 72.

The center pin 88 of the cage 90 will center the circuit board 80 so that the shafts 72 and 84 make contact with the two separated contacts on the circuit board leading through suitable feed throughs and plated leads to the components, such as a programmable read/write memory device. The circuit board 80 is maintained stationary while the supply roll 50 moves (rotates) around the circuit board. The center pin or pilot shaft thus will rotate relative to the circuit board and the stationary shaft 72 and sliding shaft 84 engage the stationary circuit board contacts.

The three springs that control the engagement of the circuit board contacts and the positioning of the hubs 60 and 62 are scaled as to the force that they exert. The spring 79, which urges the hub 62 into position into the roll, and the roll against the hub 60 is the strongest or highest force. This holds the roll 50 properly centered for rotation. The spring 93 that urges the cage 90 and the circuit board 80 toward the fixed shaft 72 is the next strongest, so that the circuit board 80 is positioned against the end surface of the tubular shaft. The spring 84A is the lowest force spring but has enough force to urge the shaft 84 into a good electrical contact with the feed through contact 84B.

The circuit board programmable read/write memory device (R/W) represented at 89 provides stored information about the web, as well as laminator enabling information so the laminator will only operate when a proper supply roll is installed.

The cage 90 has an annular wall 90B that surrounds the circuit board and inwardly projecting fingers or tabs 91 that trap the circuit boards inside the cage. Also a rearwardly extending pin portion 88A on the rear wall of the cage 90 extends through the spider 92 and a stop clip 88B on the pin portion 88A prevents the cage from being pushed out the roll when the roll is removed so that the tubular shaft 72 is no longer in position to stop outward movement of the circuit board.

A suitable encoder can be provided on the frame to record the amount of the web that has been used based on rotation of the supply roll 50. These encoders are well known and count and record increments of roll rotation. The web supply use signals can be transferred to the controller 27. The controller can provide a signal indicating the need for replacing the web supply roll 50 and removing the take up roll 52. The amount of web remaining can also be recorded so if a partially used supply roll is removed from one laminator and placed in another, the supply remaining information can be provided.

It should be noted that the web 32 is well known, and has a backing flexible layer with the protective laminate material film adhered thereto so when the heated roller 30 presses the web onto a disc, the heat and pressure will result in lamination of the protective layer onto the disc.

In FIGS. 9–12, an adjustable center hub for the tray 18 is illustrated, in the disc (CD) support recessed region of the tray. The tray 18 has an adjustable hub that will provide a support surface for the center of the disc in one position so that the laminate material will be pressed onto the disc and laminated onto the center area of the disc when the disc is passed beneath the roller 30. In a second position of the adjustable hub the upper surface of the hub will be recessed from the plane of the outer portions of the disc support surface, and there will be no backing surface to create enough pressure to laminate the laminating film on the top of the center of the disc. This is to permit omitting laminating film in the center portions of the disc when desired.

Figure 9:
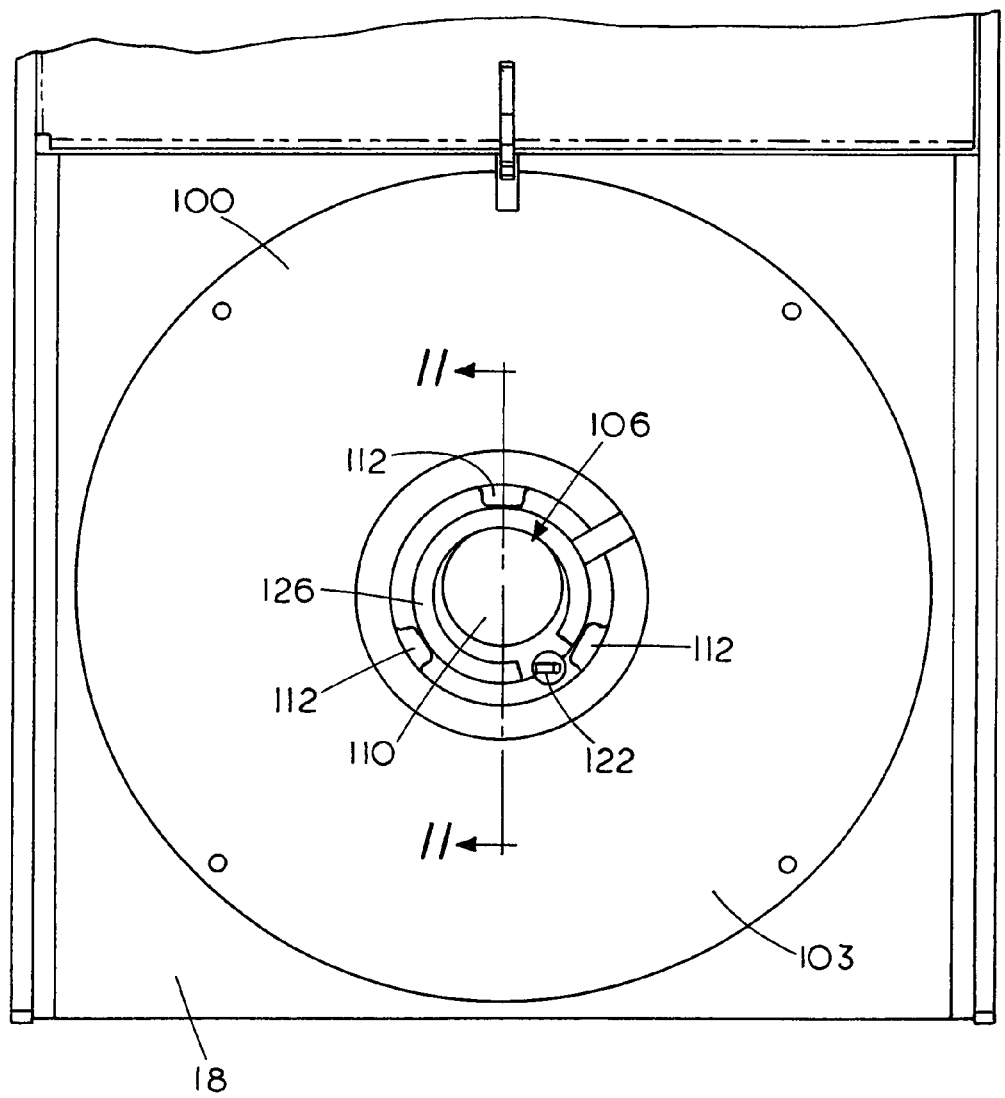
FIG. 9 is a top plan view of the laminator disc support tray in its extended position showing a recessed central portion of the support tray for providing changes in height of a hub in the center of the support tray.
Figure 10:
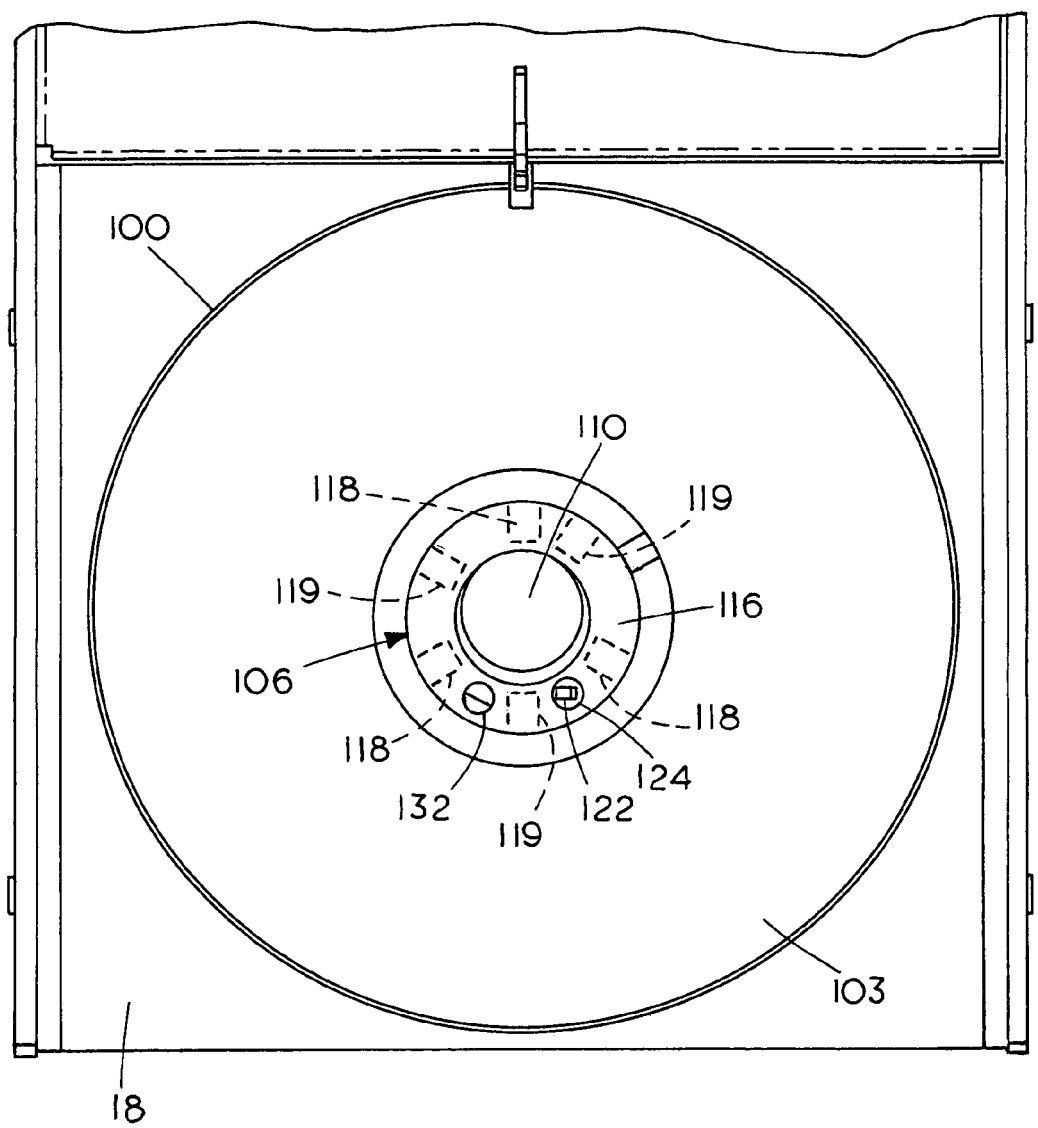
FIG. 10 is a view similar to FIG. 9, with the hub in position in the recessed central portion.
Figure 11:
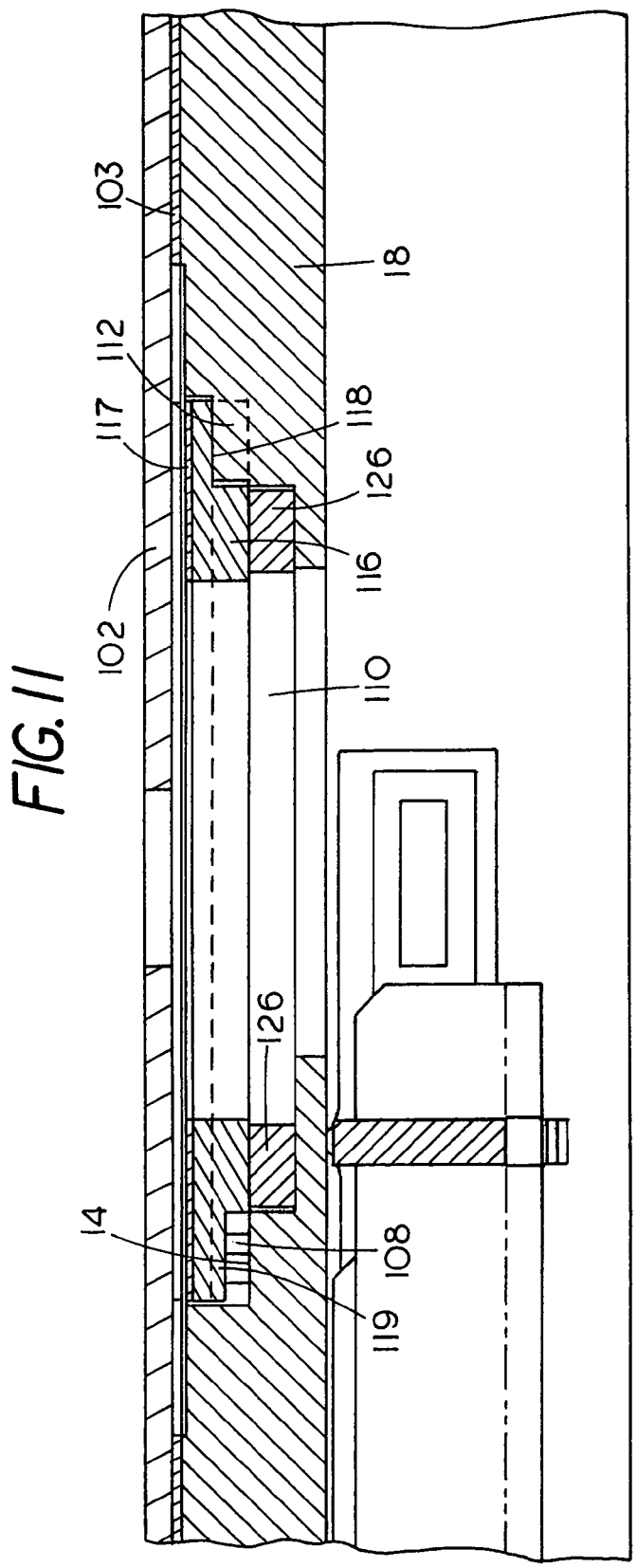
FIG. 11 is a sectional view with the hub in place taken along line 11—11 in FIG. 9.

Tray 18, as shown in FIG. 9, has a central recess 100, that is of size to support and position a compact disc, as shown in FIG. 11 at 102. The outer support portion of the recess has a support material layer portion 103 that is fixed in position on the tray. The center region 106 of the disc support recess is recessed as shown at 108. The recessed area 108 has a center opening 110, and on the peripheral portion or flange edge of recess 108, there are three raised pads 112, that are spaced 120° apart and are raised up from a surface 114 of the recess 108 (see FIGS. 10 and 11) in the center of the disc support recess 100.

The center recess 108 receives a hub ring 116 that fits into the recess 108, as shown in FIGS. 10, 11 and 12 and this hub ring 116 also has six pads that extend down from the undersurface of the outer lower edge portions of the hub. These pads are shown in dotted lines at 118 and 119 in FIG. 10, and correspond in spacing to the pads 112 in the recess 108. The lower surfaces of pads 118 and 119 are in two different planes. The hub ring 116 also has a disc support layer 117 on its upper surface.

The tray 18 has a disc sensor 122 mounted in the recess 108 that aligns with an opening 124 with the hub ring 116 in one annular position, which is a recessed position shown in FIG. 10 and also in FIG. 11. The hub ring 116 also has a second opening 132 that will align with the sensor 122 in a second annular position of hub ring 116. A magnet indicated at 126 can be used for keeping the hub ring 116 in place.

In FIGS. 10 and 11, the pads 112 in recess 108 and pads 118 on the under side of hub ring 116 are in line, or in other words, the pads 118 overlie and are supported on pads 112. In this position support layer 117 is below support layer 103.

As shown in FIG. 12, the hub ring 116 can be rotated to a position wherein the pads 119 on the under side of the hub ring 116 will align with the support pads 112 in the recess 108. In this position, the support layer 117 of hub ring 116 is co-planar with support layer 103. The amount of rotation of hub ring 116 will be such that the second opening 132 in the hub ring 116 will be overlying the sensor 122, so that the sensor 122 for operating the laminator indicating that a disc to be processed is in place will be operable to provide a signal to the controller 27.

It can be seen in FIG. 11, when the hub ring 116 is rotated to the "hub down" position the upper surface of the support layer 117 is spaced downwardly from the plane of the upper surface of support layer 103 and thus spaced from the undersurface of a disc 102 that is in position. When the laminator roll passes over this region above the hub ring 116, there will not be enough pressure generated in the center area of the disc 102 to cause lamination. When the hub ring is in its raised position shown in FIG. 12, the support layers are co-planar and the disc 102 will have a layer laminated in the center region supported by hub ring 116.

The laminating film is a well known film construction that will merely break away in areas where it is not bonded to another surface when the web moves to the take up roll.

Thus, by merely annularly shifting the hub ring 116 between its raised and lowered positions, a selection can be as to whether or not the laminating film will be adhered to the center portion of the disc that is being processed or laminated.

Although the present invention has been described with reference to preferred embodiments, workers skilled in the art will recognize that changes may be made in form and detail without departing from the spirit and scope of the invention.

What is claimed is:

1. An apparatus for connecting portions of a circuit board on an interior of a hollow core roller to at least one external contact, said roller having a first end rotatably supported on a frame, a non-rotating tubular shaft supporting a second end of the roller for rotation relative to the frame and the tubular shaft having an end surface open to an interior of the hollow core roller, a first spring exerting a load in an axial direction on the hollow core roller toward the first end of the hollow core roller, a circuit board supported on the interior of the hollow core roller adjacent the second end of the hollow core roller, said circuit board having a plane that is generally perpendicular to an axis of rotation of the hollow core roller, a first support axially fixed on the interior of the hollow core roller and spaced inwardly from the circuit board, a second support slidably mounted on the interior of the hollow core roller to an interior side of the circuit board, a second spring engaging the first support and loading the second support toward the circuit board and tubular shaft to engage the circuit board and urge the circuit board to engage the end of the tubular shaft to thereby effect a signal carrying connection between a first contact region of the circuit board and the tubular shaft.

2. The apparatus of claim 1, wherein there is a second shaft mounted on the interior of the tubular shaft and slidably mounted for at least limited axial movement relative to the tubular shaft, said second shaft having an end extendable outwardly from the end surface of the tubular shaft, a third spring urging the second shaft in a direction outwardly from the end surface of the tubular shaft toward the interior of the hollow core roller, and the second support including a pilot shaft having an end supporting the circuit board; the pilot shaft and the second shaft aligning along the axis of rotation of the hollow core roller, such that when the second spring urges the circuit board to engage the end surface of the tubular shaft, the second shaft engages the circuit board in a second contact region.

3. The apparatus of claim 2, wherein said second support including the pilot shaft comprises a cage that slidably mounts on the interior of the hollow core roller, and the cage having supports spaced outwardly from and engageable with peripheral edges of the circuit board to substantially contain the circuit board in the cage.

4. The apparatus of claim 2, wherein the first contact region of the circuit board comprises a ring contact of size to engage the end surface of the tubular shaft.

5. The apparatus of claim 2, wherein a central portion of the circuit board has an axial center bore therein, a portion of the pilot shaft entering the center bore to center the circuit board, and the circuit board having a layer of metal surrounding the center bore forming the second contact region spaced from the first contact region, said second contact region being engaged by the second shaft when the circuit board is positioned to engage the end surface of the tubular shaft.

6. The apparatus of claim 2, wherein the first spring exerts a first spring load in axial direction toward the first end of the roller and exerts the spring load at a first force greater than a second spring load exerted by the second spring urging the circuit board toward the tubular shaft, and the third spring exerting a lesser spring force than the second spring load urging the second shaft toward the circuit board.

7. The apparatus of claim 2, wherein said tubular shaft and said second shaft are insulated from each other, and are made of an electrically conductive material.

8. The apparatus of claim 1, wherein the hollow core roller has laminating material wound thereon and is mounted on a frame, a heated roller rotatably mounted on said frame, to receive laminating material from the tubular roller for laminating the material on a substrate, a pair of shield members on opposite sides of said heated roller and extending along a longitudinal length thereof, said shield members being spaced apart along one side of the heated roller to leave a slot to which the roller is exposed, the roller having exposed surface portions extending partially through a plane defined by the shield members at the slot, a drive motor for the heated roller, and a motor control to rotate the heated roller at a selected rotational speed when the roller is heated to a desired level to reduce cooling of the portion of the roller exposed at the slot.

9. The apparatus of claim 8, wherein the drive comprises a stepper motor that steps the heated roller at the selected rotational speed.

10. The apparatus of claim 9, wherein a heater is mounted to heat the heated roller, a temperature sensor providing a signal indicating the temperature at a surface of said heated roller, the motor control starting the stepper motor when the temperature of the surface of the heated roller is above the desired level.

11. The apparatus of claim 1 wherein the tubular roller is mounted on a frame and has a laminating film thereon to be laminated onto a disc substrate, a support tray on the frame for supporting a disc for lamination by passing the disc below film from the tubular roller, a heated roller on the frame, the film being pressed against a surface of the disc for lamination, the tray including a center portion and an outer support portion having an upper support surface defining a support plane, the center portion defining a region recessed below the support plane for receiving a disc, and an adjustable hub in the recessed region having at least two positions, wherein in a first position an upper surface of the hub is below the support plane of the tray, and in a second position the upper surface of the hub is substantially coplanar with the support plane.

12. The apparatus of claim 11, wherein the tray has a plurality of support pads in the recessed region spaced annularly apart that are at a desired level, the hub having mating support pads that face downwardly toward the support pads of the tray, wherein when the selected support pads on the hub are overlying the support pads on the tray, the hub is in the second position and when the hub is rotated a selected amount different support pads on the hub are overlying the pads on the tray, and the hub is in the first position.

13. The apparatus of claim 11, and a disc sensor in the recessed region of the tray, a pair of apertures in the hub, one of said apertures overlying the disc sensor in each of the two positions of the hub.

14. The apparatus of claim 13, wherein the hub is made of a magnetic material, and a magnet on the tray to create a magnetic force to attract the hub toward the tray.

15. The apparatus of claim 12, and a first separate support layer on the tray in portions surrounding the recessed region, and a second separate support layer on the hub.

16. An apparatus for connecting a pair of contacts of a circuit board on an interior of a hollow core roller to a pair of external contacts, said roller being rotatably supported on a frame, a non-rotating tubular shaft at an end of the roller, the tubular shaft having an end surface open to an interior of the hollow core roller, a circuit board supported on the interior of the hollow core roller adjacent the end surface of the tubular shaft, said circuit board having a plane that is generally perpendicular to an axis of rotation of the hollow core roller, a circuit board spring on the interior of the hollow core roller spring loading the circuit board in a direction to urge the circuit board to engage the end surface of the tubular shaft to effect a signal carrying connection between a first contact region of the circuit board and the tubular shaft, a second shaft mounted on the interior of the tubular shaft and slidably mounted for at least limited axial movement relative to the tubular shaft, said second shaft having an end extendable outwardly from the end surface of the tubular shaft, a shaft spring urging the second shaft in a direction outwardly from the end surface of the tubular shaft toward circuit board, a pilot shaft supported in the hollow core roller engaging an axial opening in the circuit board, to center and support the circuit board, the shaft spring urging the second shaft to a second central contact on the circuit board when the circuit board engages the end surface of the tubular shaft.

17. The apparatus of claim 16, wherein the first contact region of the circuit board comprises a ring contact of size to engage the end surface of the tubular shaft.

* * * * *